(No Model.)

C. G. ETTE.
LAWN SPRINKLER.

No. 486,771. Patented Nov. 22, 1892.

Witnesses
Edw. S. Duvall, Jr.
Wm. L. Boyden

Inventor
Charles G. Ette
per Fred E. Tasker,
Attorney

THE NORRIS PETERS CO., PHOTO-LITHO., WASHINGTON, D. C.

UNITED STATES PATENT OFFICE.

CHARLES G. ETTE, OF ST. LOUIS, MISSOURI.

LAWN-SPRINKLER.

SPECIFICATION forming part of Letters Patent No. 486,771, dated November 22, 1892.

Application filed July 21, 1892. Serial No. 440,725. (No model.)

*To all whom it may concern:*

Be it known that I, CHARLES G. ETTE, a citizen of the United States, residing at St. Louis, in the State of Missouri, have invented certain new and useful Improvements in Lawn-Sprinklers; and I do hereby declare the following to be a full, clear, and exact description of the invention, such as will enable others skilled in the art to which it appertains to make and use the same.

This invention relates to an improvement in lawn-sprinklers, the object of the invention being to provide a sprinkler which may combine in itself in a high degree the advantages of cheapness, extreme simplicity of construction, and great efficiency in operation; and it therefore consists in the construction, arrangement, and combination of parts, substantially as will be hereinafter described and claimed.

Figure 1:
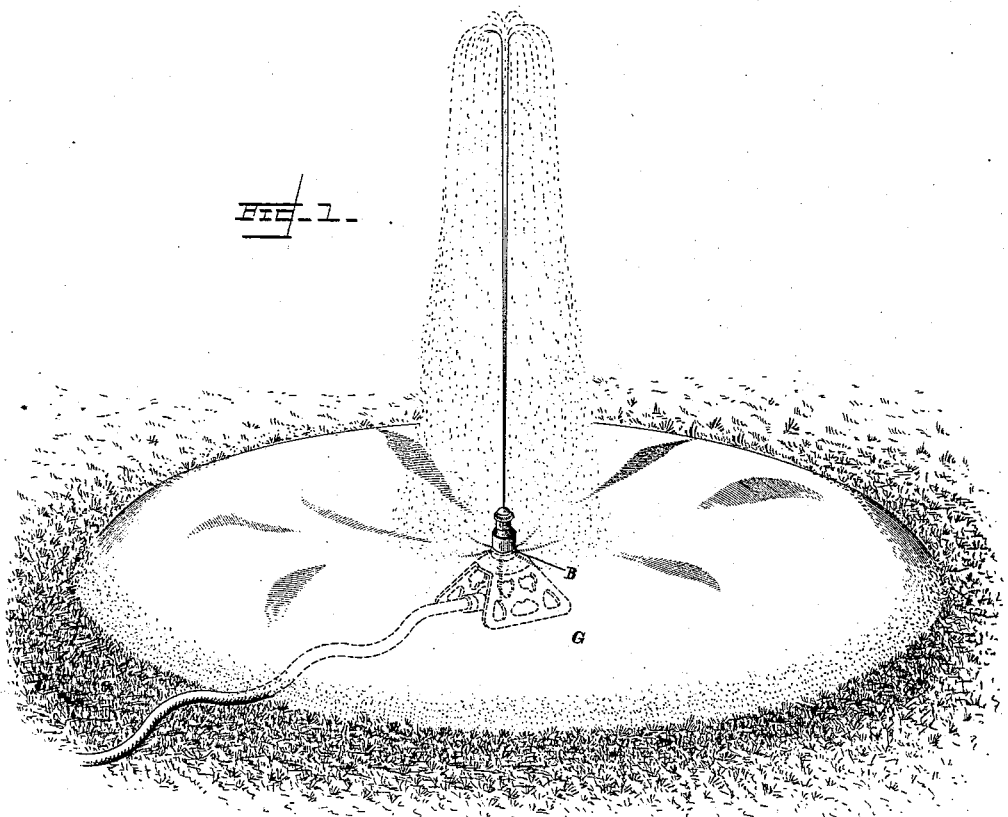
Figure 2:
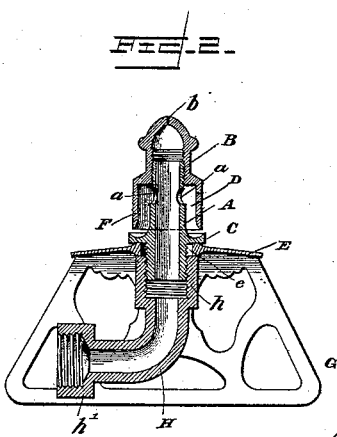

In the accompanying drawings, illustrating my invention, Figure 1 is a perspective view showing my improved lawn-sprinkler in practical use. Fig. 2 is an enlarged sectional view showing the construction and arrangement of the several parts of the sprinkler.

Like letters of reference designate corresponding parts in both figures.

The frame of my improved lawn-sprinkler is very simple, consisting of the plate E, having a central opening $e$, and provided with the integral inclined open-work sides G G, which serve as runners, their lower edges having rounded ends and adapted to slip easily over the ground, so that the lawn-sprinkler may be moved about the lawn and thus change in position as much as may be desired while the sprinkler is in operation and without being obliged to turn off the water. Of course the exact form, shape, and size of this main frame may vary within considerable limits, and I do not desire to be restricted to what I have herein represented and described, but reserve the liberty of making the frame in any suitable manner.

A designates the main tube of the sprinkler, which is located in a vertical position within the central opening $e$ of the frame-plate E. This main tube is open at its upper end and is externally screw-threaded for a short distance below said upper end. It is furthermore provided at a point contiguous to said screw-threaded portion with lateral openings $a$, of which there may be any suitable number. The tube also has preferably formed integral therewith an external horizontal disk or flange C, which is preferably situated upon the top of plate E, around the opening $e$. The disk or flange C may be of any suitable shape, size, width, or thickness. Sometimes it may be made with its upper face slightly concaved or cup-shaped, the curvature of this concave merging into the external face of the tube A above it, so as to present a neat round appearance, the outer periphery of the disk in this instance having a somewhat-sharp upper edge. This is only one, however, of the many ways in which the disk may be shaped, and I do not desire to be restricted thereto; neither do I desire to be restricted to the making of the same integral with the tube A. The tube A, below disk C, is provided externally with screw-threads, as shown in Fig. 2.

H designates a goose-neck pipe having an internally-screw-threaded enlargement $h'$ at one end, to which the supply-hose is coupled and having at the other end a similar screw-threaded enlargement $h$, which is screwed upon the lower screw-threaded end of the pipe A, said goose-neck end H thus being screwed up tightly against the lower side of the frame-plate E, and thereby clamping the tube A fixedly in position in said plate, as clearly shown in Fig. 2.

The main tube or pipe A carries thereon a suitably-shaped cap or cover B. This cap has a contracted section which is internally screw-threaded and which engages the upper screw-threaded end of the main tube A and is adjustable up and down thereon. The cap B also has an enlarged lower part F, which surrounds the laterally perforated portion of pipe A, there being a convenient internal annular space D between the perforated wall of tube A and the surrounding expanded part F of cap B. The lower end of the enlarged part F of the cap is preferably slightly curved internally, so as to make said edge somewhat sharp, and so that, in conjunction with the concave disk, a rounded passage for the outflowing water may be provided. It will be noted that by screwing the cap up or down the distance between the lower edge thereof and the disk C may be increased or diminished, and thus the size of the issuing water stream made larger or smaller. The upper end of cap B is preferably dome-shaped, and may be provided with a central perforation *b*, if desired, although this can be omitted.

Evidently the exact shape and form of the cap B may vary within wide limits without departing from the invention, it being only necessary that it should have internal screw-threads at some point which can engage the screw-threaded upper end of the main tube, so as to permit not only a connection between the cap and the tube, but also a vertical adjustment of the former upon the latter, and that also the cap shall provide a surrounding annular chamber adjacent to the perforations in the tube which can receive the water as it issues from the tube and direct the same downward upon the horizontal disk, so as to cause the proper outflow of the water which issues from the sprinkler at that point to sprinkle the surrounding ground.

I will now explain the operation of my improved lawn-sprinkler. The water enters the main pipe A through the goose-neck H from the hose and issues from the tube A through the lateral openings *a* into the annular space D, through which it passes until it strikes the disk C, when it passes out between the end of the cap and the disk, the force of the water causing it to spread then into a large circular dome-shaped sheet, which will be larger or smaller according to the size of the opening between the cap and the disk, which opening can be, as I have already stated, adjusted as much as may be desired by simply screwing the cap up or down upon the main tube. By this adjustment of the cap the diameter of the sheet of sprinkling water can be shortened or increased so as to enable the lawn-sprinkler to sprinkle more or less surface. All this will be clearly understood by referring to Fig. 1, where the device is shown in practical use. Not only does the water which passes up into the main tube A emerge from the lateral outlets, but it also goes up through the open end of tube A into the upper end of the cap B, and emerges therefrom through the central perforation *b* to form a fountain or give the effect of a fountain appearance, as shown in Fig. 1. When the perforation *b* is omitted, of course the fountain will be dispensed with, and although the water will fill the upper end of the cap, yet there will be no discharge at that point. Particular attention is called to the adjustable feature of this lawn-sprinkler. Where the water-pressure is very great it will not be necessary to screw the top cap down as close to the disk as where there is only a light pressure of water. Furthermore, the mode of connecting the cap B with the main tube by screwing the former upon the latter insures that there can be no leakage in any event. If the threads should by any possibility leak in consequence of the pressure, either from the top or bottom, it will be evident that the water can only emerge from the device either at the top perforation *b* or at the space between the lower edge of the cap and the disk. There are thus in this lawn-sprinkler no holes which are likely to become clogged or choked with gritty substances and no revolving parts which are likely to become so much worn as to cause looseness and permit a consequent leakage, and the device is so extremely simple, consisting of so few parts, that it can be readily and cheaply made and put together and without the liability of its parts becoming broken or disordered.

Modifications and changes may be made in the various parts of the lawn-sprinkler without varying from the limits of the invention which I have herein defined, and I reserve the liberty of making such changes as I may deem necessary.

Having thus described my invention, what I claim as new, and desire to secure by Letters Patent, is—

1. In a sprinkling device, a tube having lateral outlets, in combination with a surrounding cover or cap supported on the tube above and around the outlets and a disk located on the tube below the outlets, said cover and disk being relatively adjustable with respect to each other, so as to graduate the size of the outflow of water.

2. In a sprinkling device, the combination of a main tube provided with lateral outlets, an external horizontal disk on said tube, and a cap or cover carried by the tube below the outlets and providing an annular chamber around the said lateral openings and in conjunction with the disk.

3. In a sprinkler for lawns and other places, the combination of a main tube having side outlets, an external horizontal disk integral with said tube, and a cap which screws upon the upper end of the tube and has a lower annular open-ended chamber surrounding the openings in the tube, said cap being adjustable, so as to make the distance greater or less between its lower end and the aforesaid disk, substantially as described.

4. The combination, in a sprinkling device, of the main frame having runners, the main tube supported in said frame, an external disk on said tube, and a cap located on the upper end of the tube above the said disk, which cap provides an annular surrounding chamber opposite the lateral outlets in the tube and above the disk, substantially as described.

5. In a sprinkler for lawns and other purposes, the combination of the main tube having lateral outlets and an integral horizontal disk or flange formed with a concave upper face, in combination with a cap screwed upon the upper end of the said tube and having an expanded lower portion which provides an annular surrounding chamber whose lower end is contiguous to the aforesaid disk or flange, substantially as described.

6. The combination of the main tube A, having lateral openings $a\ a$, integral cup-shaped flange C on the tube below the openings $a$, and the cover B, which is vertically adjustable on the tube, being located above the flange C and being formed with the enlarged portion F, which provides the annular chamber D, said cover having a top perforation $b$, substantially as described.

In testimony whereof I affix my signature in presence of two witnesses.

CHAS. G. ETTE.

Witnesses:
H. W. HENGER,
A. H. MEYER, Jr.